(12) United States Patent
Aliyev et al.

(10) Patent No.: US 12,331,149 B2
(45) Date of Patent: Jun. 17, 2025

(54) CHROMIUM OXIDE CATALYST FOR ETHYLENE POLYMERIZATION

(71) Applicant: SABIC GLOBAL TECHNOLOGIES B.V., Bergen op Zoom (NL)

(72) Inventors: Vugar Aliyev, Geleen (NL); Xiaoyu Tan, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 792 days.

(21) Appl. No.: 17/435,099

(22) PCT Filed: Mar. 9, 2020

(86) PCT No.: PCT/EP2020/056136
§ 371 (c)(1),
(2) Date: Aug. 31, 2021

(87) PCT Pub. No.: WO2020/193104
PCT Pub. Date: Oct. 1, 2020

(65) Prior Publication Data
US 2022/0127388 A1     Apr. 28, 2022

(30) Foreign Application Priority Data

Mar. 26, 2019 (EP) ..................... 19165122

(51) Int. Cl.
| C08F 110/02 | (2006.01) |
| C08F 4/02 | (2006.01) |
| C08F 4/69 | (2006.01) |

(52) U.S. Cl.
CPC ............... *C08F 4/69* (2013.01); *C08F 4/025* (2013.01); *C08F 110/02* (2013.01); *C08F 2410/04* (2013.01); *C08F 2410/06* (2021.01)

(58) Field of Classification Search
CPC ...................................................... C08F 4/69
See application file for complete search history.

(56) References Cited

U.S. PATENT DOCUMENTS

| 2,825,721 A | 3/1958 | Hogan et al. |
| 3,023,203 A | 2/1962 | Dye |
| 3,324,095 A | 6/1967 | Carrick et al. |
| 3,324,101 A | 6/1967 | Baker et al. |
| 3,622,251 A | 11/1971 | Allen |
| 3,642,749 A | 2/1972 | Johnson et al. |
| 3,709,853 A | 1/1973 | Karapinka |
| 3,959,178 A | 5/1976 | Hogan |
| 4,003,712 A | 1/1977 | Miller |
| 4,011,382 A | 3/1977 | Levine et al. |
| 4,302,566 A | 11/1981 | Karol et al. |
| 4,461,873 A | 7/1984 | Bailey et al. |
| 4,543,399 A | 9/1985 | Jenkins, III et al. |
| 4,588,790 A | 5/1986 | Jenkins, III et al. |
| 4,882,400 A | 11/1989 | Dumain et al. |
| 5,034,364 A | 7/1991 | Kral et al. |
| 5,198,400 A | 3/1993 | Katzen et al. |
| 5,330,950 A | 7/1994 | Hsieh |
| 5,352,749 A | 10/1994 | Dechellis et al. |
| 5,541,270 A | 7/1996 | Chinh et al. |
| 6,319,995 B2 | 11/2001 | Glenn et al. |
| 6,566,450 B2 | 5/2003 | Debras et al. |
| 6,982,304 B2 | 1/2006 | Mure et al. |
| 7,122,607 B2 | 10/2006 | Hagerty et al. |
| 7,300,987 B2 | 11/2007 | Hagerty et al. |
| 8,431,658 B2 | 4/2013 | Baita et al. |
| 2018/0179308 A1 | 6/2018 | Aliyev |

FOREIGN PATENT DOCUMENTS

| CN | 108203476 A | 6/2018 | |
| WO | 8603756 A1 | 7/1986 | |
| WO | WO-2016206911 A1 * | 12/2016 | ............. C08F 10/00 |

OTHER PUBLICATIONS

Cann et al., "Comparison of Silyl Chromate and Chromium Oxide Based Olefin Polymerization Catalysts," Macromol. Symp. 2004, 213, 29-36.
International Search Report for International Application No. PCT/EP2020/056136, International Filing Date Mar. 9, 2020, Date of Mailing May 19, 2020, 6 pages.
Peacock Andrew J., "Handbook of Polyethylene, Chapter 3 Production Processes", 2000, Marcel Dekker, Inc., New York; ISBN 0824795466; p. 43-66.
Pullukat, T. J., "A Chemical Study of Thermally Activated Chromic Titanate on Silica Ethylene Polymerization Catalysts", Journal of Polymer Science, Polymer Chemisty Edition, vol. 18, 2857-2866 (1980).
Shiliang Zhang et al. "A novel SiO2-supported inorganic and organic hybrid chromium-base catalyst for ethylene polymerization" Journal of Molecular Catalysis A: Chemical, 358 (2012) 10-22.
Written Opinion for International Application No. PCT/EP2020/056136, International Filing Date Mar. 9, 2020, Date of Mailing May 19, 2020, 9 pages.

* cited by examiner

*Primary Examiner* — Catherine S Branch
(74) *Attorney, Agent, or Firm* — CANTOR COLBURN LLP

(57) ABSTRACT

The invention relates to a solid catalyst system comprising a first chromium compound, a second chromium compound, a reaction product of an alkyl aluminium compound and a nitrogen containing compound and a silicon oxide support, wherein the first chromium compound is chromium trioxide or a compound convertible to chromium trioxide, the second chromium compound is a slilylchromate compound and the nitrogen containing compound is a cycloalkylamine compound having the general formula: $R^3$—$NH_2$, wherein $R^3$ is selected from C3-C8 cycloalkyl groups.

18 Claims, No Drawings

CHROMIUM OXIDE CATALYST FOR ETHYLENE POLYMERIZATION

CROSS REFERENCE TO RELATED APPLICATIONS

This application is a National Stage application of PCT/EP2020/056136, filed Mar. 9, 2020, which claims the benefit of European Application No. 19165122.3, filed Mar. 26, 2019, both of which are incorporated by reference in their entirety herein.

This invention relates to a supported chromium oxide catalyst system for the production of polyethylene. The invention further relates to a process for the production of polyethylene using such catalyst system and polyethylene obtained thereby. The invention further relates to articles made from such polyethylene.

The production processes of LDPE, HDPE and LLDPE are summarised in "Handbook of Polyethylene" by Andrew Peacock (2000; Dekker; ISBN 0824795466) at pages 43-66. The catalysts can be divided in three different subclasses including Ziegler Natta catalysts, Phillips catalysts and single site catalysts. The various processes may be divided into solution polymerisation processes employing homogeneous (soluble) catalysts and processes employing supported (heterogeneous) catalysts. The latter processes include both slurry and gas phase processes.

Most of the existing chromium-based catalyst polymerization technology employs chromium oxide-based catalyst systems.

Chromium oxide-based catalyst was originally invented by Phillips in 1952 and hundreds of patents were published in relation to the system. The chromium oxide based catalyst, which is commonly referred to in the literature as "the Phillips catalyst", can be obtained by calcining a chromium compound carried on an inorganic oxide carrier in a non-reducing atmosphere. It is known to produce HDPE grades of fairly broad MWD ranging between 10-15. The catalyst can produce different ranges of molecular weight depending on reactor's temperature. The higher the temperature, the lower the molecular weight will be.

The chromium oxide catalysis and the ethylene polymerisation with this specific catalyst are disclosed in "Handbook of Polyethylene" by Andrew Peacock at pages 61-64. Pullukat et al. (Journal of Polymer Science; Polymer chemistry Edition; vol 18, 2857-2866; 1980) discloses thermally activated ethylene polymerisation catalysts which contain chromium and titanium on silica.

Organochromes like silylchromate (S-2) derived catalysts are also extensively used for commercial PE manufacturing. The silylchromate catalyst consists of silylchromate (bistriphenylsilyl chromate) absorbed on dehydrated silica and subsequently reduced with for example diethylaluminium ethoxide. The use of silyl chromate as a polymerization catalyst for olefin polymerization is disclosed in for example U.S. Pat. Nos. 3,324,095, 3,324,101 and 3,642,749. Silylchromate-based catalysts generally produce desirable polyethylenes relative to those produced by chromium oxide-type catalysts. Silylchromate produced polyethylenes generally have a broader molecular weight distribution than those produced using chromium oxide-type catalysts. The broader molecular weight distribution leads to better processability of the resulting polyethylene whereas the productivity of polymerisations (g PE/g catalyst) with silylchromate-based catalysts is relatively low in comparison with chromium oxide-based catalysts.

The polymerisation of ethylene with supported chromium based catalysts is disclosed by Kevin Cann in "Comparison of silyl chromate and chromium oxide based olefin polymerisation catalysts" (Macromolecular Symp, 2004, 213, 29-36).

The molecular weight (Mw) and molecular weight distribution (MWD) are important factors in determining the mechanical and rheological properties of polymers. The ratio Mw/Mn is called the polydispersity index and is an indication of the broadness weight distribution. As polydispersity index increases, MWD broadens. If the polymer were a single macromolecule, the polydispersity would be 1.0 and the polymer would be said to be monodisperse.

For polyethylene produced with transition metal catalysts, molecular weight distribution is dictated largely by the catalyst employed. Polydispersities typically range from 2-3 for polyethylene made with single site catalysts, 4-6 for polymer produced with Ziegler-Natta catalysts and 8-20 for polyethylene made with supported chromium catalysts.

It is well recognized that for certain applications it is advantageous that ethylene polymers have a broad molecular weight distribution (MWD). For example, in blow molding of articles such as bottles, broad MWD polymers are desirable because they exhibit better impact strength and have superior environmental stress crack resistance (ESCR) compared to polymers with narrow molecular weight distribution. Likewise, HDPE films with broad MWD are desirable because they exhibit good tear and impact properties. The possibility of widening polymer properties profile remains a fruitful field of research aimed at producing more versatile materials. In this sense, bimodality has become an additional degree of freedom in tailoring polyethylene (PE) properties. A bimodal polyethylene consists of a mixture of low and high molecular weight polyethylene fractions, where the term "bimodal" comes from the shape of the gel permeation chromatography curve, that is, a bimodal molecular weight distribution (MWD). As known, MWD is clearly related with the rheological properties having a great influence on polymer processing behavior. Since an increase in the molecular weight normally improves the mechanical properties of the polyethylene resins, there is a strong demand for polyethylene having high molecular weight, although it also involves processing difficulties. Therefore, bimodal resins came up as a result of the need to meet application requirements, having the best of both parts: low molecular weight for processability and high molecular weight for good mechanical properties.

There are several methods for the production of bimodal or broad molecular weight distribution resins: melt blending, reactor in series configuration, or single reactor with dual site catalysts.

The simplest method is post-reactor blending of polyethylene with different melt indices into a uniform blend, but these blends usually present miscibility problems as a consequence of some phases segregation.

U.S. Pat. No. 4,461,873 found that the physical blending of different polymers having high and low molecular weights can lead to the formation of gel. Resins with bimodal or multimodal molecular weight distribution can also be produced using the melt blending technique described by Cozewith et al in WO 86/03756. However, such methods are expensive, cumbersome and time consuming.

A two-stage cascade polymerization process is the most employed technology for bimodal polyethylene using a Ziegler-Natta catalyst. In general, in the first reactor a high hydrogen/ethylene ratio is used, resulting in a relatively low molecular weight, highly crystalline homopolymer. Then, the still active catalyst, embedded in the homopolymer, is transferred to a second reactor, with much lower hydrogen/ethylene ratio and the presence of a comonomer such as 1-butene or 1-hexene. Although, the series reactor method is the most commonly used for bimodal PE production, building such multiple reactors requires large energy consumption and capital with complicated operation procedures.

It is also known to use a single reactor containing blends of catalysts with different propagation and termination rate constants for ethylene polymerization for the production of broad or multi-modal molecular weight distribution polymer. The mixed catalyst is a physical mixture of two independent catalysts that are introduced in the reactor together. There are many advantages of using a single reactor with two catalysts for obtaining simultaneously both fractions, such as lower investment costs, easier to control, less process complexity, intimate mixing of high and low molecular weight components (improved product quality) and simplified start-ups and shut-downs. Even though this process could lead to more intimate blend of the bimodal components at a molecular level this method also has some disadvantages such as requirements of having two catalyst preparation units, two storage containers, vessel for the mixing of two catalysts, separate catalyst feeding to the reactor, difficulty to control the two catalyst weight ratio, etc.

Other possibility of making a bimodal resin is to use a hybrid catalyst, consisting on two catalysts loaded on a single support. Generally, this method is the most advantageous method compared to the other mentioned methods. In this sense, if different active sites could be attached to the same support particle, it would be possible to obtain an in-situ blend of polyethylene chains with different predominant molecular weights in only one stage process.

U.S. Pat. No. 5,330,950 discloses ethylene polymers or copolymers having very broad molecular weight distributions in a broad range of melt indices are produced by using mixtures of MgO-supported Ziegler catalyst and a chromium oxide catalyst in which the usual poisoning of the catalysts does not occur. A mixed catalyst comprising a chromium ethylene polymerization catalyst and a Ziegler ethylene polymerization catalyst gives significantly broader molecular weight distribution polymers when used in the polymerization of ethylene, to particularly high density ethylene homopolymer and high density copolymers of ethylene and higher olefins. The chromium catalyst comprises a chromium compound on an inert support and the Ziegler catalyst comprises an aluminum component and a titanium component on a magnesium oxide support in which the weight ratio of chromium catalyst to Ziegler catalyst is from 3:1 to 15:1 for maximum compatibility. Wherein the weight ratio gives a broader molecular weight distribution (MWD) than either catalyst component above. The catalyst components can be combined in any suitable manner such as by physical mixing prior to introduction to the reactor, or by separate feeding to the reactor in the desired proportions.

U.S. Pat. No. 6,566,450 describes a process wherein multimodal PE resins are produced using a metallocene catalyst in a first reactor to obtain a first PE and combining said first PE with a second PE of lower molecular weight and higher density. Different catalysts may be employed to produce the first and second PEs.

U.S. Pat. No. 3,959,178 disclose the preparation of ethylene homopolymers and copolymers of broadening molecular weight obtained utilizing a mixed catalyst comprising several portions of the same or different chromium components and metal promoted variations thereof wherein each portion is activated at a different temperature.

U.S. Pat. No. 6,982,304 B2 discloses a polyethylene resins having improved environmental stress resistance, stiffness and impact resistance is made by a process comprising feeding both a chromium oxide catalyst and a silyl chromate catalyst into a polymerization reactor. The chromium oxide catalyst and the silyl chromate catalyst are on separate supports. The chromium oxide catalyst is 25-50 weight percent and the silyl chromium catalyst is 50-75 weight percent of the total weight of catalyst. The catalysts may be added separately or as a single mixture.

U.S. Pat. No. 5,198,400 discloses the mixed chromium catalysts are useful for polymerizing of ethylene which exhibit high ESCR and useful for the production of blow molded articles. According to the invention, the mixed catalysts are comprised of a first and second chromium-containing supported catalyst component wherein the supports used for said first and second catalyst components have different pore volumes and wherein at least one of the catalyst components contains an additional element selected from aluminum, titanium, zirconium, boron or phosphorus.

U.S. Pat. No. 5,034,364 discloses alpha-olefin polymerization catalyst composition, supported on a refractory oxide support comprises two chromium species: (1) $CrO_3$ or any chromium compound calcinable to $CrO_3$; and (2) at least one silylchromate compound. The silica SD-186 was used as a support obtained from Joseph Crosfield & Sons Ltd. The composition is prepared by sequentially depositing specie (1) and (2) onto the same support. According to the invention, the catalyst composition polymerizes ethylene to resins which produce high molecular weight, high density films having substantially improved strength properties, as compared to films made from resins polymerized with ether one of the catalytically-active components.

It is an objective of the present invention to provide a solid catalyst system which can be used for the production of polyethylene with a broad, preferably bimodal, molecular weight distribution. Preferably, the solid catalyst system has a high activity.

Accordingly, the present invention provides a solid catalyst system comprising a first chromium compound, a second chromium compound, a reaction product of an alkyl aluminium compound and a nitrogen containing compound and a silicon oxide support, wherein
 the first chromium compound is chromium trioxide or a compound convertible to chromium trioxide,
 the second chromium compound is a slilylchromate compound and
 the nitrogen containing compound is a cycloalkylamine compound having the general formula: $R^3$—NH2, wherein $R^3$ is selected from C3-C8 cycloalkyl groups.

It was surprisingly found that the polyethylene produced using the solid catalyst system according to the invention has high molecular weight and a broad molecular weight distribution. Further, the solid catalyst system according to the invention has a high activity.

First Chromium Compound

The first chromium compound may be chromium trioxide (i.e. $CrO_3$) or any compound convertible to chromium trioxide. For compounds convertible to chromium trioxide see U.S. Pat. Nos. 2,825,721: 3,023,203; 3,622,251 and 4,011,382.

Suitable compounds convertible to chromium oxide include for example, chromium acetyl acetone, chromium chloride, chromium nitrate, chromium acetate, chromium acetate hydroxide, chromium sulfate, ammonium chromate, ammonium dichromate, and other soluble chromium containing salts.

Second Chromium Compound

The second chromium compound is a slilylchromate compound. The silylchromate catalysts disclosed in U.S. Pat. Nos. 3,324,101 and 3,324,095. The Silyl chromate catalysts are characterized by the following formula:

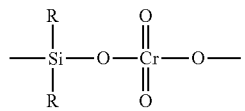

wherein R is hydrocarbyl group having from 1 to 14 carbon atoms, such as an alkyl, alkaryl, aralkyl or an aryl radical containing from 1 to 14 carbon atoms, preferably from 3 to 10 carbon atoms. Illustrative thereof, are methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p methyl-phenyl, phenyl, tolyl, xylyl, naphthyl, ethylphenyl, methylnaphthyl, dimethylnaphthyl.

Illustrative of the preferred silylchromates are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate. The particularly preferred silylchromate compound is bis-triphenylsilylchromate.

Preferably, the amount of the first chromium compound and the amount of the second chromium compound are selected such that the amount of chromium with respect to the solid catalyst system is 0.10 to 2.0 wt %, for example 0.20 to 1.0 wt % or 0.50 to 0.90 wt %.

Preferably, the amount of the first chromium compound with respect to the total of the first chromium compound and the second chromium compound is 10 to 90 wt %.

In some embodiments, the amount of the first chromium compound with respect to the total of the first chromium compound and the second chromium compound is more than 65 wt % and at most 90 wt %. This results in a high molecular weight distribution of polyethylene obtained using the catalyst system. The catalyst activity is high.

In some embodiments, the amount of the first chromium compound with respect to the total of the first chromium compound and the second chromium compound is more than 35 wt % and at most 65 wt %.

In some embodiments, the amount of the first chromium compound with respect to the total of the first chromium compound and the second chromium compound is at least 10 wt % and at most 35 wt %. This results in a high Mw of polyethylene obtained using the catalyst system.

Reaction Product of Alkyl Aluminium Compound and Nitrogen Containing Compound

Aluminium Alkyl Compound

The alkyl aluminium compound is an organo aluminium compound having the formula $AlR_3$, in which R is a hydrocarbon radical containing 1-10 carbon atoms.

Suitable examples of the alkyl aluminium compound include trimethyl aluminum, triethyl aluminum, triisobutyl aluminum, tri-n-hexyl aluminum and tri octyl aluminum. Preferably, the alkyl aluminium compound is triethyl aluminum or triisobutyl aluminum.

Nitrogen Containing Compound

The nitrogen containing compound is a cycloalkylamine having the general formula $R3-NH2$, wherein R3 is selected from C3-C8 cycloalkyl groups.

More preferably, the nitrogen containing compound is selected from the group consisting of cyclopropylamine, cyclobutylamine, cyclopentylamine, cyclohexylamine, cycloheptylamine and cyclooctylamine, more preferably selected from cyclohexylamine and cyclooctylamine, most preferably is cyclohexylamine.

The catalyst system according to the present invention does not comprise pyrrole-containing compounds such as for example hydrogen pyrrolide or pyrole, derivative of hydrogen pyrrolide and metal pyrrolide complexes because these compounds are unsuitable to be applied as the nitrogen containing compound.

Preferably, the molar ratio of Cr to N in the solid catalyst system is 1.0 to 10.0, for example 2.0 to 10.0.

Preferably, the molar ratio of Al to N in the solid catalyst system is 0.1 to 4.0, more preferably 1.0 to 3.0.

Preferably, the molar ratio of Al to Cr in the solid catalyst system is 0.1 to 25, more preferably 0.5 to 10, 1.0 to 5.0 or 1.1 to 3.0. Very preferably, the molar ratio of Al to Cr in the solid catalyst system is 1.3 to 1.9. Most preferably, the molar ratio of Al to Cr in the solid catalyst system is 1.4 to 1.7. This results in a very high catalyst activity.

Silicon Oxide Support

In the catalyst system according to the invention, the first chromium compound and the second chromium compound are on supported on the silicon oxide support.

Preferably, the silicon oxide support has an average particle diameter of 20 to 50 μm. The average particle diameter is determined via ASTM D-1921 12.

Preferably, the silicon oxide support has a pore volume of at least 0.8 $cm^3/g$, preferably 1.10 to 1.75 $cm^3/g$. The pore volume is determined by ASTM D4284-12 (2012) "Standard Test Method for Determining Pore Volume Distribution of Catalysts and Catalyst Carriers by Mercury Intrusion Porosimetry".

Preferably, the silicon oxide support has a surface area of 150 to 800 $m^2/g$, preferably 250 to 550 $m^2/g$. The surface area of the support is determined by the BET nitrogen adsorption method. Test Method: ASTM D 1993-03 (2013) Standard Test Method for Precipitated Silica-Surface Area by Multipoint BET Nitrogen Adsorption. See also references "Adsorption, Surface Area and Porosity" by S. J. Gregg and K. S. W. Sing, Academic Press, London (1982) and "Introduction to Powder Surface Area" by S. Lowell, J. Wiley & Sons, New York, NY, (1979).

Preferably, the silicon oxide support has a pore radius of 100 to 200 Angstrom. The pore radius is determined by ASTM D4284-12 (2012) "Standard Test Method for Determining Pore Volume Distribution of Catalysts and Catalyst Carriers by Mercury Intrusion Porosimetry".

Non-Chromium Metal Compound

Preferably, the catalyst system further comprises a non-chromium metal compound, i.e. a metal compound which contains a metal which is not chromium. This non-chromium metal compound acts as a modifier and is used for the synthesis of the solid catalyst component according to the invention.

Preferably, the non-chromium compound is a metal halide transition metal compound and is selected from compounds represented by formulas $Tm(OR^5)_nX_{4-n}$ and $Tm(R^6)_nX_{4-n}$, wherein Tm represents a transition metal of Group IVB, VB, or VIB, $R^5$ and $R^6$ is independently selected from $C_1$-$C_{20}$ alkyl groups, $C_1$-$C_{20}$ aryl groups and $C_1$-$C_{20}$ cycloalkyl groups, X represents a halogen atom, preferably chlorine and n represents a number satisfying $0 \leq n \leq 4$, preferably $1 \leq n \leq 4$.

Preferably, the metal in the non-chromium metal compound, Tm, is selected from titanium, vanadium, hafnium and zirconium, and is most preferably titanium.

Examples of suitable titanium compounds include titanium alkoxy compounds for example tetraethoxy titanium, tetramethoxy titanium, tetrabutoxy titanium, tetrapropoxy titanium (in particular tetraisopropoxy titanium), tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride.

Other suitable non-chromium metal compounds include for example vanadium trichloride, vanadium tetrachloride, vanadium oxytrichloride and zirconium tetrachloride.

Preferably, the amount of the metal in the non-chromium metal compound in the solid catalyst system, in particular the amount of Ti in the solid catalyst system, is between 0.1 and 10.0% by weight, preferably in the range between 0.1 and 6.0% by weight.

Preferably, the weight ratio between the metal in the non-chromium metal compound in the solid catalyst system and Cr, in particular Ti:Cr, is 2 to 4.

Process for Preparation of Catalyst System

The invention further relates to a process for the preparation of the catalyst system according to the invention, comprising i) mixing the silica support provided with the first chromium compound and the optional non-chromium compound with the second chromium compound and
ii) treating the product obtained by step i) with the reaction product of the aluminium alkyl compound and the nitrogen-containing compound.

Activation

The first chromium compound may require activation prior to use. Activation by calcination can be accomplished by heating the first chromium compound (supported on the silica support) in steam, dry air or another oxygen containing gas at temperatures up to the sintering temperature of the support. Activation temperatures are typically in the range of 300° C. to 950° C., preferably from 500° C. to 900° C. and activation times are typically from about 10 min. to as about 72 hrs. The first chromium compound may optionally be reduced after activation using for example, carbon monoxide or a mixture of carbon monoxide and nitrogen.

Process for Producing Polyethylene

The present invention further relates to a process for the production of polyethylene by polymerisation of ethylene and an optional comonomer in the presence of the catalyst system according to the invention.

Preferably, the polyethylene is a high density polyethylene having a density in the range between 945 and 965 kg/m3.

The polyethylene may be an ethylene homopolymer or an ethylene copolymer of ethylene and a comonomer selected from the group consisting of propylene, 1-butene, 1-pentene, 4-methyl-1-pentene, 1-hexene and 1-octene, preferably 1-hexene.

In the process according to the invention, the solid catalyst system of the present invention is added to a polymerization zone using a dry catalyst feeder. The operation is often carried out under a nitrogen atmosphere and the dry catalyst is transferred to the reactor under positive nitrogen pressure. For methods of feeding a dry catalyst to a polymerization reactor is described for example, in U.S. Pat. Nos. 6,319,995 and 8,431,658.

The process may be a slurry phase or a gas phase polymerization process, preferably a gas phase polymerization process.

The gas phase polymerization process may use any gas phase reactor for gas phase polymerizations and may e.g. be vertically, horizontally mechanically agitated reactor or a fluidized bed reactor.

In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomers flowing through the bed. Unreacted monomers and other optional gaseous components exit the fluidized bed and are contacted with a cooling system to remove this heat. The cooled gas stream, including monomer, comonomer and optional for example condensable liquids, is then re-circulated through the polymerization zone. Simultaneously, polymer product is withdrawn from the reactor. The reactor temperature in a gas phase process may range between for example 30° C. and 130° C. A description of a gas phase process is disclosed in for example U.S. Pat. Nos. 4,543,399 and 4,588,790.

Suitable fluidized bed reactors include for example a bubbling fluidized bed reactor, a circulating fluidized bed reactor, an annular fluidized bed reactor, a multi-zone fluidized bed reactor and a flash reactor. With 'fluidized bed' is meant that an amount of solid particles (in this case preferably the solid catalyst and/or the solid catalyst to which the monomer is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid. An example of a process using a fluidized bed for producing polyolefins is disclosed in U.S. Pat. No.

4,882,400. Other examples of processes using a fluidized bed for producing polyolefins are described in, for example, U.S. Pat. Nos. 3,709,853; 4,003,712; 4,011,382; 4,302,566; 4,543,399; 4,882,400; 5,352,749; 5,541,270; 7,122,607, and 7,300,987.

The present invention further relates to the polyethylene obtainable by or obtained by the process according to the invention.

Preferably, the polyethylene according to the invention wherein the process is a slurry phase polymerization process has at least one of:

high-load melt index (HLMI 21.6 kg) of 0.1 to 20 g/10 min, for example 1 to 12 g/10 min, according to ISO 1133-1:2011

Mw/Mn of 30 to 70 according to size exclusion chromatography (SEC) measurement density of 930 to 970 kg/m3 according to ISO1183 resin bulk density of 400 to 500 kg/m3 according to ASTM D-1895

The present invention further relates to a composition comprising the high density polyethylene obtainable by or obtained by the process according to the invention. The composition may further comprise additives for example lubricants, fillers, stabilisers, antioxidants, compatibilizers and pigments. The additives used to stabilize the polymers may be, for example, additive packages including hindered phenols, phosphites, UV stabilisers, antistatics and stearates.

The invention also relates to a molded article comprising the high density polyethylene or the composition comprising the high density polyethylene according to the present invention. The molded article may preferably be a blow molded article or an extrusion molded article. The molded article may preferably be selected from films, pipes, bottles, IBC containers, tight head and open head drums and fuel tanks.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Catalyst Preparation

EXAMPLES A TO E

Catalyst Preparation 150 g of a silica-supported chromium oxide catalyst with surface area of 300 m²/g, pore volume of 1.5 ml/g and average particle size of 48 µm (activated at 825° C.) was placed in a flask. Then 7.5 g of silyl chromate (SC) was added into the flask such that the CrOx/SC weight ratio was 53/47, and both solids were mixed.

Dried and degassed isopentane was introduced into the flask equipped with a magnetic stirrer and the mixture was stirred for 2 hours at room temperature. Then a reaction product of triisobutyl aluminum (TIBAL) and cyclohexylamine (CHA) was added via syringe into the flask in amounts as shown in Table 1. Subsequently, the catalyst system was dried under vacuum at 60° C. The amount of Cr in the final catalyst system was 0.87 wt % with respect to the catalyst system.

EXAMPLES F, G

Example B was repeated except that the amount of silyl chromate was selected such that the CrOx/SC weight ratio was as shown in Table 2.

EXAMPLE H (COMPARATIVE)

Example B was repeated except that diethylaluminum ethoxide (DEALE) was added instead of the reaction product of TIBAL and CHA.

Ethylene Polymerization

The polymerization reaction was carried out in a two liters stirred autoclave reactor in deoxygenated isopentane using the respective catalyst system A-H. The polymerization reaction was conducted at 100° C. and 20 bars (290 psi) of total pressure. Ethylene polymerization was carried out for 1 hour, with ethylene supplied on demand to maintain the total reactor pressure at 20 bar. Upon completion of the polymerization, the reactor was vented and cooled to ambient temperature to recover the polymer.

Polymer molecular weight and its distribution (MWD) were determined by Polymer Labs 220 gel permeation chromatograph. The chromatograms were run at 150° C. using 1,2,4-trichlorobenzene as the solvent with a flow rate of 0.9 ml/min. A refractive index detector is used to collect the signal for molecular weights. The software used is Cirrus from PolyLab for molecular weights from GPC. The calibration of the HT-GPC uses a Hamielec type calibration with broad standard and fresh calibration with each sample set.

Results are shown in Table 1.

TABLE 1

| Example | CrOx/SC ratio (%) | Al/Cr molar ratio | Al/N molar ratio | Cat. Activity g PE/g.cat.hr | Density (g/cc) | Mw | MWD |
|---|---|---|---|---|---|---|---|
| A | 53/47 | 1.2 | 2.8 | 553 | | | |
| B | 53/47 | 1.6 | 2.8 | 777 | 0.949 | 595274 | 40 |

TABLE 1-continued

| Example | CrOx/SC ratio (%) | Al/Cr molar ratio | Al/N molar ratio | Cat. Activity g PE/g.cat.hr | Density (g/cc) | Mw | MWD |
|---|---|---|---|---|---|---|---|
| C | 53/47 | 1.8 | 2.8 | 617 | | | |
| D | 53/47 | 2.0 | 2.8 | 497 | | | |
| E | 53/47 | 2.7 | 2.8 | 447 | | | |
| F | 70/30 | 1.6 | 2.8 | 1193 | 0.946 | 446274 | 35 |
| G | 30/70 | 1.6 | 2.8 | 577 | | 677493 | 37 |
| H | 53/47 | 1.6 | — | 711 | 0.961 | 316205 | 28 |

The comparison of Example B and H shows that the use of the reaction product of TIBAL/CHA results in a higher Mw and broader MWD of the produced polyethylene.

The comparison of Examples A-E shows that the catalyst exhibits the highest activity at Al/Cr=1.6 molar ratio.

The comparison of Examples B, F and G shows that Mw and MWD can be adjusted by adjusting the ratio between CrOx and SC. The MWD was the highest at CrOx/SC ratio of 53/47.

The invention claimed is:

1. A solid catalyst system comprising a first chromium compound, a second chromium compound, a reaction product of an alkyl aluminium compound and a nitrogen containing compound and a silicon oxide support, wherein
   the first chromium compound is chromium trioxide or a compound convertible to chromium trioxide,
   the second chromium compound is a silylchromate compound,
   the nitrogen containing compound is a cycloalkylamine compound having the general formula: $R^3$—$NH_2$, wherein $R^3$ is selected from C3-C8 cycloalkyl groups,
   the molar ratio of the amount of Al in the solid catalyst system with respect to the amount of Cr in the solid catalyst system is 1.4 to 1.7.

2. The solid catalyst system according to claim 1, wherein the first chromium compound is selected from the group consisting of chromium trioxide, chromium acetyl acetone, chromium chloride, chromium nitrate, chromium acetate, chromium acetate hydroxide, chromium sulfate, ammonium chromate and ammonium dichromate.

3. The solid catalyst system according to claim 1, wherein the amount of Cr in the catalyst system is 0.10 to 2.0 wt %, with respect to a total weight of the catalyst system.

4. The solid catalyst system according to claim 1, wherein the amount of the first chromium compound with respect to the total of the first chromium compound and the second chromium compound is more than 35 wt % and at most 90 wt %.

5. The solid catalyst system according to claim 1, wherein the amount of the first chromium compound with respect to the total of the first chromium compound and the second chromium compound is at least 10 wt % and at most 35 wt %.

6. The solid catalyst system according to claim 1, wherein the alkyl aluminium compound is selected from the group consisting of trimethyl aluminum, triethyl aluminum, tri-isobutyl aluminum, tri-n-hexyl aluminum and tri octyl aluminum.

7. The solid catalyst system according to claim 1, wherein the nitrogen containing compound is selected from the group consisting of cyclopropylamine, cyclobutylamine, cyclopentylamine, cyclohexylamine, cycloheptylamine and cyclooctylamine.

8. The solid catalyst system according to claim 1, wherein the silicon oxide support has an average particle diameter of 20 to 50 μm, and/or a pore volume of at least 0.8 cm³ and/or a surface area of 150 to 800 m²/g.

9. The solid catalyst system according to claim 1, further comprising a non-chromium metal compound.

10. The solid catalyst system according to claim 9, wherein the non-chromium metal compound is a titanium alkoxy compound selected from the group consisting of tetraethoxy titanium, tetramethoxy titanium, tetrabutoxy titanium, tetrapropoxy titanium, tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, and butoxy titanium dichloride.

11. A process for the preparation of the solid catalyst system according to claim 1, comprising
   i) mixing the silicon oxide support provided with the first chromium compound and an optional non-chromium compound with the second chromium compound and
   ii) treating the product obtained by step i) with the reaction product of the aluminium alkyl compound and the nitrogen-containing compound.

12. A process for the production of polyethylene by polymerisation of ethylene and an optional comonomer in the presence of the solid catalyst system according to claim 1.

13. The solid catalyst system according to claim 1, wherein the amount of Cr in the catalyst system is 0.10 to 1.0 wt %, with respect to a total weight of the catalyst system.

14. The solid catalyst system according to claim 1, wherein the nitrogen containing compound is selected from the group consisting of cyclohexylamine and cyclooctylamine.

15. The solid catalyst system according to claim 1, further comprising a non-chromium metal compound represented by $Tm(OR^5)_nX_{4-n}$ or $Tm(R^6)_nX_{4-n}$ wherein
   Tm represents a transition metal of Group IVB, VB, or VIB,
   $R^5$ and $R^6$ is independently selected from C1-C20 alkyl groups, C1-C20 aryl groups and C1-C20 cycloalkyl groups,
   X represents a halogen atom, and
   n represents a number satisfying $0 \leq n \leq 4$,
   wherein $1 \leq n \leq 4$.

16. The solid catalyst system according to claim 1, wherein:
   the molar ratio of Cr to N in the solid catalyst system is 2.0 to 10.0; and
   the molar ratio of Al to N in the solid catalyst system is 1.0 to 3.0.

17. The solid catalyst system according to claim 16, wherein:
   the first chromium compound is selected from the group consisting of chromium trioxide, chromium acetyl acetone, chromium chloride, chromium nitrate, chromium acetate, chromium acetate hydroxide, chromium sulfate, ammonium chromate and ammonium dichromate;
   the amount of Cr in the catalyst system is 0.10 to 2.0 wt %;
   the amount of the first chromium compound with respect to the total of the first chromium compound and the second chromium compound is more than 35 wt % and at most 90 wt %;

the amount of the first chromium compound with respect to the total of the first chromium compound and the second chromium compound is at least 10 wt % and at most 35 wt %;

the alkyl aluminium compound is selected from the group consisting of trimethyl aluminum, triethyl aluminum, triisobutyl aluminum, tri-n-hexyl aluminum and tri octyl aluminum;

the nitrogen containing compound is selected from the group consisting of cyclopropylamine, cyclobutylamine, cyclopentylamine, cyclohexylamine, cycloheptylamine and cyclooctylamine;

the silicon oxide support has an average particle diameter of 20 to 50 μm, a pore volume of at least 0.8 cm$^3$, and a surface area of 150 to 800 m$^2$/g; and the solid catalyst system further comprises a titanium alkoxy compound selected from the group consisting of tetraethoxy titanium, tetramethoxy titanium, tetrabutoxy titanium, tetrapropoxy titanium, tetraisobutoxy titanium, tetrapentoxy titanium, triethoxychloro titanium, diethoxydichloro titanium, trichloethoxy titanium, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride and titanium tetrachloride.

18. The solid catalyst system according to claim 17, wherein:

the amount of Cr in the catalyst system is 0.50 to 0.90 wt % with respect to a total weight of the catalyst system;

the alkyl aluminium compound comprises triisobutyl aluminum; and the nitrogen containing compound comprises cyclohexylamine.

* * * * *